(12) United States Patent
Kalgaonkar et al.

(10) Patent No.: US 10,954,427 B2
(45) Date of Patent: Mar. 23, 2021

(54) METHOD AND COMPOSITION FOR SEALING A SUBSURFACE FORMATION

(71) Applicant: Saudi Arabian Oil Company, Dhahran (SA)

(72) Inventors: Rajendra Arunkumar Kalgaonkar, Abqaiq (SA); Vikrant Wagle, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/982,048

(22) Filed: May 17, 2018

(65) Prior Publication Data

US 2019/0352555 A1 Nov. 21, 2019

(51) Int. Cl.
*C09K 8/506* (2006.01)
*C09K 8/504* (2006.01)
*E21B 33/138* (2006.01)

(52) U.S. Cl.
CPC ............ *C09K 8/506* (2013.01); *C09K 8/5045* (2013.01); *E21B 33/138* (2013.01); *C09K 2208/10* (2013.01)

(58) Field of Classification Search
None
See application file for complete search history.

(56) References Cited

U.S. PATENT DOCUMENTS

| 2,935,472 | A |   | 5/1960  | Klaas et al.    |            |
|-----------|---|---|---------|-----------------|------------|
| 3,202,214 | A | * | 8/1965  | McLaughlin, Jr. | C04B 24/04 |
|           |   |   |         |                 | 166/292    |
| 3,850,249 | A | * | 11/1974 | Hess            | B01J 31/0202 |
|           |   |   |         |                 | 166/295    |

(Continued)

FOREIGN PATENT DOCUMENTS

| WO | 0153429 A1    | 7/2001  |
|----|---------------|---------|
| WO | 2004109053 A2 | 12/2004 |

OTHER PUBLICATIONS

International Search Report and Written Opinion dated Jul. 5, 2019 pertaining to International application No. PCT/US2019/032009 filed May 13, 2019.
Hatzignatiou et al., Water-Soluble Silicate Gelants: Comparison and Screening for Conformance Control in Carbonate Naturally Fractured Reservoirs, Journal of Non-Crystalline Solids 479, pp. 72-81, 2018.
Huang et al., "Systematic Approach to Develop a Collodial Silica Based Gel System for Water Shut-off", SPE-183942-MS, 2017.

(Continued)

*Primary Examiner* — Anuradha Ahuja
(74) *Attorney, Agent, or Firm* — Dinsmore & Shohl LLP

(57) ABSTRACT

A method for plugging and sealing subsurface formations using alkaline nanosilica dispersion and a delayed activation chemistry is disclosed. In accordance with one embodiment of the present disclosure, the method includes introducing a mixture with a first pH into the subsurface formation. The mixture comprises an aqueous solution, an alkaline nanosilica dispersion and a water-soluble hydrolyzable compound. The method further includes allowing the water-soluble hydrolyzable compound to hydrolyze in the subsurface formation to form an acid at 70° C. or greater, thereby acidizing the mixture to a reduced second pH and causing the alkaline nanosilica dispersion to gel into a solid and seal the subsurface formation. A composition for sealing a subsurface formation is also disclosed. The composition includes an aqueous mixture including water, an alkaline nanosilica dispersion, and a water-soluble hydrolyzable compound.

16 Claims, 1 Drawing Sheet

(56) References Cited

U.S. PATENT DOCUMENTS

| | | | |
|---|---|---|---|
| 4,564,070 A * | 1/1986 | Norton | C09K 17/48 |
| | | | 166/295 |
| 4,732,213 A * | 3/1988 | Bennett | C09K 8/50 |
| | | | 166/275 |
| 4,799,549 A | 1/1989 | Vinot et al. | |
| 4,901,797 A * | 2/1990 | Summers | C09K 8/5045 |
| | | | 166/292 |
| 5,203,834 A * | 4/1993 | Hutchins | C09K 8/50 |
| | | | 166/270 |
| 5,320,171 A | 6/1994 | Laramay | |
| 5,712,314 A | 1/1998 | Surles et al. | |
| 6,472,461 B1 | 10/2002 | Nakamura et al. | |
| 6,518,224 B2 | 2/2003 | Wood | |
| 6,582,819 B2 | 6/2003 | McDaniel et al. | |
| 6,615,918 B2 | 9/2003 | Bayliss et al. | |
| 6,821,623 B2 | 11/2004 | Kvesic | |
| 7,013,973 B2 | 3/2006 | Danican et al. | |
| 7,163,358 B2 * | 1/2007 | Greenwood | C04B 28/26 |
| | | | 405/263 |
| 7,455,112 B2 | 11/2008 | Moorehead et al. | |
| 7,458,424 B2 | 12/2008 | Odeh et al. | |
| 7,482,309 B2 | 1/2009 | Ravi et al. | |
| 7,926,567 B2 | 4/2011 | Harris et al. | |
| 7,934,557 B2 | 5/2011 | Nguyen | |
| 7,954,549 B2 | 6/2011 | Lende et al. | |
| 8,030,251 B2 | 10/2011 | Todd et al. | |
| 8,607,895 B2 | 12/2013 | Hoskins | |
| 8,776,882 B2 | 7/2014 | Shindgikar et al. | |
| 8,822,388 B2 | 9/2014 | Burns et al. | |
| 9,040,468 B2 | 5/2015 | Loiseau et al. | |
| 9,045,965 B2 | 6/2015 | Patil et al. | |
| 9,133,386 B2 | 9/2015 | Kumar et al. | |
| 9,284,798 B2 | 3/2016 | Jamison et al. | |
| 9,518,210 B2 | 12/2016 | Ezell et al. | |
| 9,546,534 B2 | 1/2017 | Lecerf et al. | |
| 9,688,901 B2 | 6/2017 | Fontenot | |
| 9,765,252 B2 | 9/2017 | Roddy et al. | |
| 10,053,613 B1 * | 8/2018 | Kalgaonkar | C09K 8/508 |
| 2002/0022694 A1 | 2/2002 | Wallenwein et al. | |
| 2004/0129460 A1 | 7/2004 | MacQuoid et al. | |
| 2001/0244978 | 12/2004 | Shaarpour | |
| 2005/0252659 A1 | 11/2005 | Sullivan et al. | |
| 2006/0019834 A1 * | 1/2006 | Melbouci | C09K 8/04 |
| | | | 507/100 |
| 2008/0035343 A1 * | 2/2008 | Odeh | C09K 8/5045 |
| | | | 166/293 |
| 2008/0275176 A1 | 11/2008 | Limin et al. | |
| 2009/0042750 A1 | 2/2009 | Pauls et al. | |
| 2009/0221452 A1 | 9/2009 | Whitfill et al. | |
| 2009/0314493 A1 * | 12/2009 | Harris | C01B 33/154 |
| | | | 166/305.1 |
| 2010/0016183 A1 | 1/2010 | Roddy et al. | |
| 2010/0293814 A1 | 11/2010 | Skaja et al. | |
| 2010/0298175 A1 | 11/2010 | Ghassemzadeh | |
| 2011/0094746 A1 | 4/2011 | Allison et al. | |
| 2012/0061083 A1 * | 3/2012 | Ballard | C09K 8/035 |
| | | | 166/305.1 |
| 2013/0284518 A1 | 10/2013 | Wu et al. | |
| 2013/0292120 A1 | 11/2013 | Patil et al. | |
| 2014/0061123 A1 * | 3/2014 | Summer | C02F 1/50 |
| | | | 210/601 |
| 2014/0069644 A1 * | 3/2014 | Reddy | C09K 8/03 |
| | | | 166/278 |
| 2014/0158354 A1 * | 6/2014 | Kumar | E21B 21/003 |
| | | | 166/293 |
| 2014/0158359 A1 | 6/2014 | Davidson et al. | |
| 2014/0162910 A1 | 6/2014 | Braley et al. | |
| 2014/0262281 A1 | 9/2014 | Kulkarni et al. | |
| 2015/0008044 A1 | 1/2015 | Fontenot | |
| 2015/0021027 A1 * | 1/2015 | Chapman | C09K 8/035 |
| | | | 166/292 |
| 2015/0267500 A1 * | 9/2015 | Van Dongen | E21B 33/1208 |
| | | | 277/336 |
| 2015/0344772 A1 | 12/2015 | Droger et al. | |
| 2016/0017204 A1 | 1/2016 | Hill et al. | |
| 2016/0122625 A1 * | 5/2016 | Singh | C09K 8/467 |
| | | | 166/307 |
| 2017/0166795 A1 | 6/2017 | Walker et al. | |
| 2017/0218248 A1 | 8/2017 | Boul et al. | |
| 2017/0247602 A1 | 8/2017 | Belakshe et al. | |
| 2017/0362499 A1 | 12/2017 | Welton | |
| 2018/0346797 A1 * | 12/2018 | Kalgaonkar | C09K 8/572 |
| 2019/0055456 A1 | 2/2019 | Wagle et al. | |
| 2019/0078012 A1 | 3/2019 | Wagle et al. | |

OTHER PUBLICATIONS

Patil et al., "Environmentally Acceptable Compositions Comprising Nanomaterials for Plugging and Sealing Subterranean Formations", SPE-154917, 2012.

Musaed N. J. Alawad et al., Utilization of shredded waste car tyres as a fracture seal material (FSM) in oil and gas drilling operations, Journal of Petroleum and Gas Engineering, vol. 8, No. 3, May 30, 2017, pp. 21-28.

International Search Report and Written Opinion dated Apr. 17, 2019 pertaining to International application No. PCT/US2019/017797 filed Feb. 13, 2019, 14 pgs.

International Search Report and Written Opinion dated Apr. 17, 2019 pertaining to International application No. PCT/US2019/017813 filed Feb. 13, 2019, 14 pgs.

International Search Report and Written Opinion dated Apr. 17, 2019 pertaining to International application No. PCT/US2019/017796 filed Feb. 13, 2019, 14 pgs.

Office Action dated Aug. 19, 2019 pertaining to U.S. Appl. No. 16/274,804, filed Feb. 13, 2019, 29 pgs.

Office Action dated Aug. 19, 2019 pertaining to U.S. Appl. No. 16/274,817, filed Feb. 13, 2019, 28 pgs.

Office Action dated Aug. 19, 2019 pertaining to U.S. Appl. No. 16/274,837, filed Feb. 13, 2019, 29 pgs.

Office Action dated Aug. 19, 2019 pertaining to U.S. Appl. No. 16/274,831, filed Feb. 13, 2019, 28 pgs.

Office Action dated Dec. 9, 2019 pertaining to U.S. Appl. No. 16/274,831, filed Feb. 13, 2019, 20 pgs.

Office Action dated Dec. 9, 2019 pertaining to U.S. Appl. No. 16/274,804, filed Feb. 13, 2019, 21 pgs.

Office Action dated Dec. 9, 2019 pertaining to U.S. Appl. No. 16/274,817, filed Feb. 13, 2019, 21 pgs.

Office Action dated Dec. 9, 2019 pertaining to U.S. Appl. No. 16/274,837, filed Feb. 13, 2019, 21 pgs.

International Search Report and Written Opinion dated May 14, 2019 pertaining to International application No. PCT/US2019/017816 filed Feb. 13, 2019, 14 pgs.

Notice of Allowance and Fee(s) Due dated Apr. 22, 2020 pertaining to U.S. Appl. No. 15/981,998 filed May 17, 2018, 7 pgs.

Office Action dated Feb. 6, 2020 pertaining to U.S. Appl. No. 15/981,998 filed May 17, 2018, 11 pgs.

International Search Report and Written Opinion dated Jul. 23, 2019 pertaining to International application No. PCT/US2019/032012 filed May 13, 2019, 13 pgs.

GCC Examination Report dated Jun. 24, 2020 for Application No. GC 2019-37584.

Office Action dated Oct. 7, 2020 pertaining to U.S. Appl. No. 16/667,263, filed Oct. 29, 2019, 32 pgs.

Notice of Allowance dated Nov. 3, 2020 pertaining to U.S. Appl. No. 16/274,804, filed Feb. 13, 2019, 22 pgs.

Notice of Allowance dated Nov. 9, 2020 pertaining to U.S. Appl. No. 16/274,817, filed Feb. 13, 2019, 22 pgs.

Examination Report dated Oct. 17, 2020 pertaining to GCC Patent Application No. 2019/37583 filed May 16, 2019.

* cited by examiner

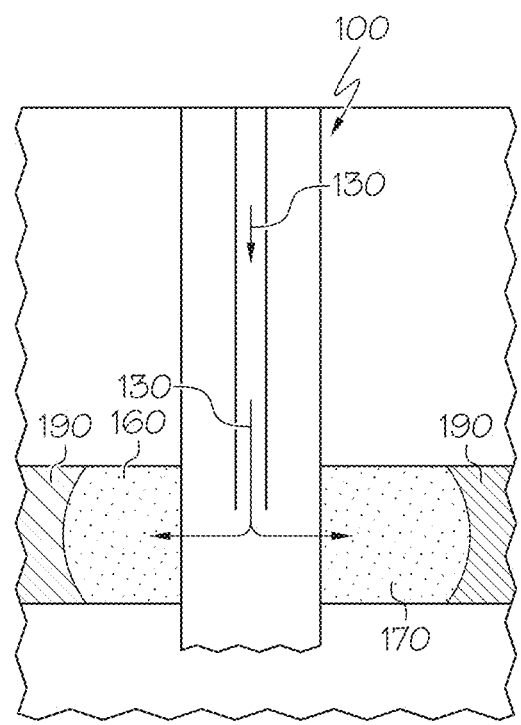

METHOD AND COMPOSITION FOR SEALING A SUBSURFACE FORMATION

TECHNICAL FIELD

The present disclosure relates to natural resource well drilling and hydrocarbon production and, more specifically, to methods and compositions for plugging and sealing subsurface formations.

BACKGROUND

Excessive water production greatly affects the economic life of producing wells. High water cut, such as a water cut of greater than 50%, largely affects the economic life of producing wells and is also responsible for many oilfield-related damage mechanisms, such as scale deposition, fines migration, asphaltene precipitation, and corrosion. In such water production instances, methods and compositions for plugging and sealing subsurface zones that lead to high water cut in wells can be utilized to decrease the water cut.

SUMMARY

It is often desirable to seal a subsurface formation to decrease water production from that subsurface formation. Sealing the water-producing formation prevents contaminating hydrocarbon production from a producing formation with water from a water-producing formation. The water-producing formation may be either above or below the oil-producing formation. A high water cut leads to increased operating costs to separate, treat, and dispose of the produced water according to environmental regulations. Though there are a variety of chemicals used by the industry to control water production, most of them are not accepted in the regions with strict environmental regulations.

The present disclosure provides compositions for plugging and sealing water producing subsurface formations. Conventional sealing methods utilizing silica to gel and seal the formation have pumped the silica and acid compound separately. Pumping these compositions separately increases surface equipment utilization and overall treatment time, which increases the cost of the operation. Furthermore, when pumping acid in separately to gel the silica composition in carbonate formations, acid may be spent acidizing the carbonate formation, leaving less acid available to gel the silica composition.

Accordingly, there is a continuing need for a sealing method that will not acidize carbonate formations and will result in low operating costs compared to conventional sealing methods. This need is met by the sealant mixture in the present disclosure, which includes both an alkaline nanosilica dispersion and a water-soluble hydrolyzable compound so the compositions are pumped into the formation simultaneously. The water-soluble hydrolyzable compound used to gel the nanosilica enables the sealant to be precisely placed into the target subsurface formation because the delayed activation chemistry gels the alkaline nanosilica dispersion into a solid once activated by the elevated temperature inside the subsurface formation, of at least 50° C. The water-soluble hydrolyzable compound forms an acid at temperatures of at least 50° C. In this way, the sealant mixture of the present disclosure successfully avoids premature gelling within the wellbore or before the mixture enters the formation, thereby avoiding premature plugging of pipelines, coiled tubing or other tubing. Furthermore, by including a water-soluble hydrolyzable compound in the mixture, at least 90%, or at least 95%, or at least 99% of the acid will be used to gel the alkaline nanosilica dispersion, even in carbonate formations, and no more than 10%, or 5%, or 1% will be spent acidizing the carbonate formation. Lastly, silica is considered environmentally benign, and therefore may be used as a subsurface formation sealant in regions with strict environmental regulations.

According to the subject matter of the present disclosure, a method for plugging and sealing subsurface formations using alkaline nanosilica dispersion and a delayed activation chemistry is disclosed. In accordance with one embodiment of the present disclosure, the method includes introducing a mixture with a first pH into the subsurface formation. The mixture comprises an aqueous solution, an alkaline nanosilica dispersion and a water-soluble hydrolyzable compound. The method further includes allowing the water-soluble hydrolyzable compound to hydrolyze in the subsurface formation to form an acid at 70° C. or greater, thereby acidizing the mixture to a reduced second pH and causing the alkaline nanosilica dispersion to gel into a solid and seal the subsurface formation.

In accordance with another embodiment of the present disclosure, a composition for sealing a subsurface formation is disclosed. The composition includes an aqueous mixture including water, an alkaline nanosilica dispersion, and a water-soluble hydrolyzable compound.

Additional features and advantages of the described embodiments will be set forth in the detailed description which follows. The additional features and advantages of the described embodiments will be, in part, readily apparent to those skilled in the art from that description or recognized by practicing the described embodiments, including the detailed description which follows as well as the drawings and the claims.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 1 schematically depicts a creation of a seal in a subsurface formation according to one or more embodiments described in this disclosure.

DETAILED DESCRIPTION

As used throughout this disclosure, the term "anisotropy" refers to variation in physical properties observed in different directions.

As used throughout this disclosure, the term "casing" refers to large-diameter pipe cemented in place during the construction process to stabilize the wellbore. The casing forms a major structural component of the wellbore and may protect fresh water formations, isolate a zone of lost returns, or isolate formations with significantly different pressure gradients. Casing may also prevent the formation wall from caving into the wellbore, isolate the different formations to prevent the flow or crossflow of formation fluid, and provide a means of maintaining control of formation fluids and pressure as the well is drilled. Casing is usually manufactured from plain carbon steel that is heat-treated to varying strengths, but may be specially fabricated of stainless steel, aluminum, titanium, fiberglass and other materials.

As used throughout this disclosure, the term "formation" refers to a body of rock that is sufficiently distinctive and continuous from the surrounding rock bodies that the body of rock can be mapped as a distinct entity. A formation is, therefore, sufficiently homogenous to form a single identifiable unit containing similar rheological properties throughout the formation, including, but not limited to, porosity and permeability. A formation is the fundamental unit of lithostratigraphy.

As used throughout this disclosure, the term "gelation time" refers the time it takes for a solution to form a gel. Gelation time is a parameter for screening gel formulations, characterizing gel formulation performance, and designing gel treatments.

As used throughout this disclosure, the term "hydrolyzable" refers to a chemical's ability to be hydrolyzed, to cleave chemical bonds in the presence of water. Hydrolysis is the reaction of cation, anion, or both, with water molecules, in which the pH of the mixture is altered and the cleavage of H—O bonds takes place.

As used throughout this disclosure, the term "moiety" refers to a part of a molecule.

As used throughout this disclosure, the term "producing formation" refers to the formation from which hydrocarbons are produced.

As used throughout this disclosure, the term "reservoir" refers to a subsurface formation having sufficient porosity and permeability to store and transmit fluids.

As used throughout this disclosure, the term "target formation" refers to the water-producing formation to be sealed.

As used throughout this disclosure, the term "water coning" refers to the change in the oil-water contact profile as a result of drawdown pressures during production. Coning may occur in vertical or slightly deviated wells and is dependent on the characteristics of the fluids involved and the ratio of horizontal to vertical permeability.

As used throughout this disclosure, the term "water cresting" refers to the change in oil-water contact profile as a result of drawdown pressures during production. Cresting may occur in horizontal or highly deviated wells and is dependent on the characteristics of the fluids involved and the ratio of horizontal to vertical permeability.

As used throughout this disclosure, the term "water cut" refers to the ratio of water produced compared to the volume of total liquids produced.

As used throughout this disclosure, the term "wellbore" refers to the drilled hole or borehole, including the openhole or uncased portion of the well. Borehole may refer to the inside diameter of the wellbore wall, the rock face that bounds the drilled hole.

To produce hydrocarbons from a hydrocarbon-containing formation, production wells are drilled to a depth that enables these hydrocarbons to travel from the subsurface formation to the surface. However, some formations in contact with the wellbore may include water, which may lead to water production from the well. High water production, or water cut, is generally undesirable, and sealing the water-producing formation will decrease the water cut and increase the amount of hydrocarbons produced over the lifetime of the well.

The present disclosure is directed to methods and compositions for sealing a subsurface formation. The method includes introducing a mixture with a first pH into the subsurface formation. The mixture comprises an aqueous solution, an alkaline nanosilica dispersion and a water-soluble hydrolyzable compound. The method further includes allowing the water-soluble hydrolyzable compound to hydrolyze in the subsurface formation to form an acid at 70° C. or greater, thereby acidizing the mixture to a reduced second pH and causing the alkaline nanosilica dispersion to gel into a solid and seal the subsurface formation. The composition includes an aqueous mixture including water, an alkaline nanosilica dispersion, and a water-soluble hydrolyzable compound. The alkaline nanosilica dispersion may include from 5 to 60 weight percent (wt. %), from 10 to 60 wt. %, from 20 to 60 wt. %, from 30 to 60 wt. %, from 40 to 60 wt. %, from 50 to 60 wt. %, from 5 to 50 wt. %, from 10 to 50 wt. %, from 20 to 50 wt. %, from 30 to 50 wt. %, from 40 to 50 wt. %, from 5 to 40 wt. %, from 10 to 40 wt. %, from 20 to 40 wt. %, from 30 to 40 wt. %, from 25 to 35 wt. %, from 5 to 30 wt. %, from 10 to 30 wt. %, from 20 to 30 wt. %, from 5 to 20 wt. %, from 10 to 20 wt. %, or from 5 to 10 wt. % nanosilica. The weight ratio of the alkaline nanosilica dispersion to the water-soluble hydrolyzable compound in the aqueous mixture may range from 50:1 to 80:1, from 55:1 to 80:1, from 60:1 to 80:1, from 65:1 to 80:1, from 70:1 to 80:1, from 75:1 to 80:1, 50:1 to 75:1, from 55:1 to 75:1, from 60:1 to 75:1, from 65:1 to 75:1, from 70:1 to 75:1, from 50:1 to 70:1, from 55:1 to 70:1, from 60:1 to 70:1, from 65:1 to 70:1, from 50:1 to 65:1, from 55:1 to 65:1, from 60:1 to 65:1, from 50:1 to 60:1, from 55:1 to 60:1, or from 50:1 to 55:1. The aqueous mixture may include from 0.1 to 10 volume percent (vol. %), from 0.5 to 10 vol. %, from 1 to 10 vol. %, from 2 to 10 vol. %, from 5 to 10 vol. %, from 8 to 10 vol. %, 0.1 to 8 vol. %, from 0.5 to 8 vol. %, from 1 to 8 vol. %, from 2 to 8 vol. %, from 5 to 8 vol. %, from 0.1 to 5 vol. %, from 0.5 to 5 vol. %, from 1 to 5 vol. %, from 2 to 5 vol. %, from 0.1 to 2 vol. %, from 0.5 to 2 vol. %, from 1 to 2 vol. %, from 0.1 to 1 vol. %, from 0.5 to 1 vol. %, or from 0.1 to 0.5 vol. % of the water-soluble hydrolyzable compound.

Referring now to FIG. 1, an example installation for sealing a subsurface formation is illustrated. As shown in FIG. 1, the installation may include a well 100 in contact with a subsurface formation 190. The seal 160 formed by the gelled solid 170 of the mixture 130, according to the methods of the present disclosure, may seal at least a portion of the subsurface formation 190 from the well 100. Although the seal 160 is depicted in FIG. 1 as impeding horizontal flow from the formation to the well 100, the method and compositions described in this disclosure may also be used to impede multidirectional flow, such as vertical flow or combinations of vertical and horizontal flow, for example. Furthermore, although the well 100 is depicted in FIG. 1 as a vertical well, the well 100 may be a horizontal well or a deviated well.

Among other benefits, the mixture may be acceptable for use in regions with strict environmental regulations. The alkaline nanosilica dispersion component of the mixture is considered environmentally benign and possesses low viscosity, for example, less than 5 centiPoise (cP), during the injection stage. Furthermore, the gelation time of the mixture may vary by adjusting the concentration of the hydrolyzable compound in the mixture. This allows for a predictable gelation time that may range from a few minutes to several hours at a given temperature, ranging from 70 to 250° C. Therefore, the injection time may be controlled based on a variety of circumstances, such as, but not limited to, how deep into the formation the seal is desired, the formation pressure, the formation temperature, the formation porosity, the formation permeability, the formation anisotropy, the water content of the formation, and the fracture gradient of the formation. A predictable gelation time enables the sealant to be precisely placed in to the target subsurface formation before the nanosilica gels, thereby avoiding premature plugging of pipelines, coiled tubing or other tubing.

As previously discussed in this disclosure, the mixture includes an alkaline nanosilica dispersion. An alkaline nanosilica dispersion is a stable dispersion of particles where the particle density and liquid viscosity are such that the particles do not settle. The particles are large enough that they would not pass through a membrane or allow other molecules or ions to pass freely through the dispersion. In one embodiment, the alkaline nanosilica dispersion is a stable aqueous dispersion. The particles may be silicon dioxide ($SiO_2$) with particle sizes ranging from 1 to 100 nanometers (nm), from 20 to 80 nm, from 40 to 60 nm, from 10 to 50 nm, from 20 to 45 nm, from 1 to 45 nm, from 1 to 25 nm, from 5 to 50 nm, from 5 to 15 nm, from 45 to 100 nm, from 45 to 85 nm, from 45 to 60 nm, from 45 to 55 nm, from 45 to 50 nm, from 50 to 100 nm, from 60 to 90 nm, or from 70 to 80 nm. The alkaline nanosilica dispersion may include from 30 to 50 wt. %, from 40 to 60 wt. %, from 30 to 60 wt. %, from 20 to 50 wt. %, from 20 to 60 wt. %, from 40 to 50 wt. %, from 40 to 45 wt. %, from 30 to 40 wt. %, from 35 to 45 wt. %, or from 45 to 50 wt. % $SiO_2$. The alkaline nanosilica dispersion may include from 0 to 3 wt. %, from 0.1 to 3 wt. %, from 0.1 to 2.5 wt. %, from 0.1 to 2 wt. %, from 0.1 to 1.5 wt. %, from 0.1 to 1 wt. %, from 0.1 to 0.5 wt. %, from 0.5 to 3 wt. %, from 0.5 to 2 wt. %, from 0.5 to 1.5 wt. %, from 0.5 to 1 wt. %, from 1 to 1.5 wt. %, from 1 to 2 wt. %, from 1 to 2.5 wt. %, from 1 to 3 wt. %, from 1 to 3.5 wt. %, from 1 to 4 wt. %, or from 2 to 3 wt. % glycerin. The alkaline nanosilica dispersion may include from 47 to 70 wt. %, from 40 to 50 wt. %, from 40 to 60 wt. %, from 40 to 70 wt. %, from 40 to 80 wt. %, from 47 to 50 wt. %, from 47 to 60 wt. %, from 47 to 70 wt. %, from 47 to 80 wt. %, from 50 to 55 wt. %, from 50 to 60 wt. %, from 50 to 70 wt. %, from 50 to 80 wt. %, from 60 to 65 wt. %, from 60 to 70 wt. %, from 60 to 75 wt. %, from 60 to 80 wt. %, or from 70 to 80 wt. % water. In a specific embodiment, the alkaline nanosilica dispersion may include 45 wt. % $SiO_2$. The alkaline nanosilica dispersion may appear white or off-white and include a particle size of 45 nm, a pH at 25° C. of 11, of greater than 7, of greater than 9, or of greater than 10, and a specific gravity of 1.32, of from 1.1 to 1.4, of from 1.15 to 1.35, of from 1.2 to 1.35, of from 1.25 to 1.35, or of from 1.3 to 1.35.

As previously discussed in this disclosure, the mixture also includes a water-soluble hydrolyzable compound. The mixture may include from 0.25 to 4 vol. %, from 0.25 to 0.5 vol. %, from 0.25 to 1 vol. %, from 0.25 to 1.5 vol. %, from 0.25 to 2 vol. %, from 0.25 to 2.5 vol. %, from 0.25 to 3 vol. %, from 0.25 to 3.5 vol. %, from 0.25 to 4 vol. %, from 0.25 to 4.5 vol. %, from 0.25 to 5 vol. %, from 0.5 to 1 vol. %, from 0.5 to 1.5 vol. %, from 0.5 to 2 vol. %, from 0.5 to 2.5 vol. %, from 0.5 to 3 vol. %, from 0.5 to 3.5 vol. %, from 0.5 to 4 vol. %, from 0.5 to 4.5 vol. %, from 0.5 to 5 vol. %, from 1 to 1.5 vol. %, from 1 to 2 vol. %, from 1 to 2.5 vol. %, from 1 to 3 vol. %, from 1 to 3.5 vol. %, from 1 to 4 vol. %, from 1 to 4.5 vol. %, from 1 to 5 vol. %, from 1.5 to 2 vol. %, from 1.5 to 2.5 vol. %, from 1.5 to 3 vol. %, from 1.5 to 3.5 vol. %, from 1.5 to 4 vol. %, from 1.5 to 4.5 vol. %, from 1.5 to 5 vol. %, from 2 to 2.5 vol. %, from 2 to 3 vol. %, from 2 to 3.5 vol. %, from 2 to 4 vol. %, from 2 to 4.5 vol. %, from 2 to 5 vol. %, from 3 to 3.5 vol. %, from 3 to 4 vol. %, from 3 to 4.5 vol. %, from 3 to 5 vol. %, from 3.5 to 4 vol. %, from 3.5 to 4.5 vol. %, from 3.5 to 5 vol. %, from 4 to 4.5 vol. %, or from 4 to 5 vol. % water-soluble hydrolyzable compound. Similarly, the mixture may include from 600 to 1000 pounds per thousand gallons of fluid (ppt), from 600 to 900 ppt, from 600 to 800 ppt, from 600 to 700 ppt, from 700 to 1000 ppt, from 700 to 900 ppt, from 700 to 800 ppt, from 800 to 1000 ppt, from 800 to 900 ppt, from 900 to 1000 ppt, or approximately 759.45 ppt water-soluble hydrolyzable compound. Various water-soluble hydrolyzable compounds are contemplated and may include an organic salt, for example. Organic salts are a salt containing an organic ion, that is, an ion that contains a carbon atom. The organic salt may include a carboxylic acid moiety, an organic compound that includes a carboxyl group. When hydrolyzed, the water-soluble hydrolyzable compound including the carboxylic acid moiety forms a carboxylic acid. Various organic salts are contemplated and may include diethylene glycol diformate, ethyl acetate, ethyl formate, ethylene glycol diacetate, or diethylene glycol dilactate. When hydrolyzed, diethylene glycol diformate and ethyl formate generate formic acid. When hydrolyzed, ethyl acetate and ethylene glycol diacetate generate acetic acid. When hydrolyzed, diethylene glycol dilactate forms lactic acid.

As previously discussed in this disclosure, the mixture further includes an aqueous solution. In some embodiments, the aqueous solution may include one or more than one of fresh water, salt water, brine, connate brine, municipal water, formation water, produced water, well water, filtered water, distilled water, and sea water. In some embodiments, the aqueous solution may include water or a solution containing water and one or more inorganic compounds dissolved in the water or otherwise completely miscible with the water. In some embodiments, the aqueous solution may contain brine, including natural and synthetic brine. Brine includes water and a salt that may include calcium chloride, calcium bromide, sodium chloride, sodium bromide, other salts, and combinations of these. The aqueous solution may include total dissolved solids of from 150,000 to 300,000 milligrams per liter (mg/L) (150 to 300 kilograms per cubic meter ($kg/m^3$); 1,000 mg/L=1 $kg/m^3$).

The mixture may further include a filtration control additive, a viscosifier, a pH control additive, or combinations of these. The filtration control additive may include at least one of starch, such as Dextrid®, produced by Halliburton, and polyanionic cellulose, such as PAC R, produced by Schlumberger. The starch may include a modified and bacterially stabilized starch product used to reduce mud filtrate in most water-based mud systems. The starch may be functional in freshwater and saturated salt environments, does not increase fluid viscosity, is temperature stable, meaning that it will not chemically degrade, to approximately 121° C., and may be used in both drilling fluid and reservoir drill-in fluid applications. The starch may be used to encapsulate drill cuttings and exposed wellbore formations to reduce particle dispersion and reactive clay/shale formation swelling. The starch may have a specific gravity of 1.5. The addition of a filtration control additive results in several benefits, such as reduced filtration rates, improved borehole stability, filtration control without detrimental viscosity increase, and decreased clay dispersion, as nonlimiting examples.

The viscosifier may include at least one of bentonite and xanthan gum, also known as XC polymer. Bentonite is a material composed of clay minerals, predominantly montmorillonite with minor amounts of other smectite group minerals, conventionally used in drilling mud. Bentonite swells considerably when exposed to water, making it ideal for protecting formations from invasion by drilling fluids.

Xanthan gum is a high-molecular weight biopolymer (ranging from approximately 1,500,000 to 2,500,000 grams per mole), and provides versatile rheology control in a wide range of brines and drilling fluids. Xanthan gum comprises a high viscosity at low shear, which may result in continuous suspension of solids in low concentration drilling fluids even at low shear. The heat resistance present in xanthan gum makes it a reliable displacing agent and mobile control agent. Xanthan gum is considered non-hazardous and suitable for use in environmentally sensitive locations and applications. Increasing the viscosity of the mixture through the addition of viscosifiers results in several benefits, such as minimized pumping friction in lime, freshwater and saltwater muds, decreased damage to oil formation, decreased maintenance expense, decreased total cost of operation, and stabilized uniform suspension of particles, as nonlimiting examples.

The pH control additive may include sodium hydroxide, or caustic soda, which, as a strong alkaline compound, controls the alkalinity in sodium-based clear brine fluids. Sodium hydroxide may be used to help solubilize acidic additive compounds that are difficult to dissolve in neutral to low pH environments. Without being limited by theory, increasing the pH of the mixture through the addition of a pH control additive may affect the gelation time of the mixture, as the alkaline nanosilica dispersion gels when the mixture reaches an acidic, second pH. As previously discussed in this disclosure, a predictable gelation time enables the sealant to be precisely placed in to the target subsurface formation before the nanosilica gels, and directly affects the injection time. Therefore, the gelation time of the mixture may be determined based on the amount of pH control additive in the mixture and by the amount of water-soluble hydrolyzable compound in the mixture.

The mixture has an initial viscosity that enables the mixture to be injected a farther distance into the formation compared to conventional sealing materials. In some embodiments, the aqueous mixture may have a viscosity of less than 5 cp (5 milliPascal seconds (mPa·s); 1 cp=1 mPa·s). For example, in some embodiments, the mixture may have a viscosity of from 0.1 cP to 100 cP, 0.1 cP to 70 cP, from 0.1 cP to 40 cP, from 0.1 cP to 20 cP, from 0.1 cP to 10 cP, from 0.1 cP to 5 cP, from 0.1 cP to 3 cP, from 0.1 cP to 2 cP, from 0.1 cP to 1 cP, from 0.1 cP to 0.5 cP, from 0.5 cP to 5 cP, from 0.5 cP to 3 cP, from 0.5 cP to 2 cP, from 0.5 cP to 1 cP, from 1 cP to 5 cP, or from 1 cP to 3 cP.

In one embodiment, the composition of the present disclosure includes a homogenous aqueous mixture including water, an alkaline nanosilica dispersion, and a water-soluble hydrolyzable compound. The aqueous mixture may be homogenous.

Referring again to FIG. 1, as previously discussed in this disclosure, the method includes introducing the mixture 130 into the subsurface formation 190. The mixture 130 includes a first pH of greater than 7, or of greater than 9, or of 9 to 11, or of approximately 10. Introducing the mixture 130 into the subsurface formation 190 may include injecting the mixture 130 into the subsurface formation 190. The mixture 130 may be injected into the subsurface formation 190 by a well 100. After being introduced into the subsurface formation, the hydrolyzable compound within the mixture 130 hydrolyzes within the subsurface formation 190 to form an acid at 70° C. or greater, thereby acidizing the mixture 130 to a second, acidic, pH and causing the alkaline nanosilica dispersion to gel into a gelled solid 170 and seal the subsurface formation 190. The second pH of the mixture 130 may be less than 7, less than 5, less than 4, or approximately 3. The subsurface formation 190 may have a temperature of from 70° C. to 250° C., and this temperature may activate the water-soluble hydrolyzable compound. The subsurface formation may include carbonate or sandstone. The gelation time for the mixture 130 to form a gelled solid 170 to create the seal 160 in the subsurface formation 190 ranges from 2 minutes to 5 hours. The method may be used to seal the wellbore from downhole water coning or water cresting, to seal the channel behind the casing, to seal the channel from the injector, to seal the wellbore from cross flow, or to seal natural fractures. The method may further result in less than 100 gallons, less than 10 gallons, less than 5 gallons, less than 3 gallons, or less than 1 gallon of fluid breakthrough.

EXAMPLES

The following example illustrates features of the present disclosure but is not intended to limit the scope of the disclosure.

Example 1

To test the capacity of the alkaline nanosilica dispersion to form a gelled solid when combined with a water-soluble hydrolyzable compound that forms an acid at greater than 70° C. or greater, 100 mL of alkaline nanosilica dispersion and 2 gm of diethylene glycol diformate were mixed well using a stirrer. The alkaline nanosilica dispersion along with the diethylene glycol diformate was subjected to static aging at 200° F. (93° C.; $T_{(°C.)}=(T_{(°F.)}-32)\times 5/9$) for 16 hours. After 16 hours of static aging, the alkaline nanosilica dispersion was converted into a solid.

Example 2

In order to examine the ability of the nanosilica gelled solid to plug and seal a water producing zone, filtration tests were conducted on three mixtures using an Ofite HTHP Filter Press. The compositions of the three mixtures are given in Tables 1A-1C. The components are measured by gallons per thousand gallons of fluid (gpt) or pounds per thousand gallons of fluid (ppt).

TABLE 1A

Comparative mixture 1 contains only water, caustic soda, and alkaline nanosilica dispersion, and does not contain a water-soluble hydrolyzable compound or conventional filtration control additives.

| Additives | Mixing time (min) | Amount | Function |
|---|---|---|---|
| Water | | 408 gpt | Carrier |
| Caustic soda | 5 | 0.71 ppt | pH Control |
| Alkaline nanosilica dispersion | 5 | 759.45 ppt | Sealant |

TABLE 1B

Comparative mixture 2 contains water, caustic soda, conventional filtration control additives, and alkaline nanosilica dispersion, but does not contain a water-soluble hydrolyzable compound.

| Additives | Mixing time (min) | Amount | Function |
|---|---|---|---|
| Water | | 408 gpt | Carrier |
| Bentonite | 20 | 11.42 ppt | viscosifier |
| XC polymer | 5 | 5.71 ppt | Biopolymer viscosifer |
| Starch | 5 | 11.42 ppt | Filtration control additive |
| Pac R | 5 | 1.42 gpt | Filtration control additive |
| Caustic soda | 5 | 0.71 ppt | pH Control |
| Alkaline nanosilica dispersion | 5 | 759.45 ppt | Sealant |

TABLE 1C

Inventive mixture 3 contains water, caustic soda, conventional filtration control additives, alkaline nanosilica dispersion, and a water-soluble hydrolyzable compound, diethylene glycol diformate.

| Additives | Mixing time (min) | Amount | Function |
|---|---|---|---|
| Water | | 408 gpt | Carrier |
| Bentonite | 20 | 11.42 ppt | viscosifier |
| XC polymer | 5 | 5.71 ppt | Biopolymer viscosifer |
| Starch | 5 | 11.42 ppt | Filtration control additive |
| Pac R | 5 | 1.42 gpt | Filtration control additive |
| Caustic soda | 5 | 0.71 ppt | pH Control |
| Alkaline nanosilica dispersion with diethylene glycol diformate hydrolyzable compound | 5 | 759.45 ppt | Sealant |

After mixing, the respective viscosities of comparative mixture 1, comparative mixture 2, and inventive mixture 3 were measured at 511 inverse seconds ($s^{-1}$) at 120° F. with a Fann 35 rheometer. These viscosities are shown below in Table 2.

TABLE 2

Viscosities for comparative mixture 1, comparative mixture 2, and inventive mixture 3.

| Fluid | Viscosity (cp) |
|---|---|
| Comparative mixture 1 | 5 |
| Comparative mixture 2 | 43 |
| Inventive mixture 3 | 44 |

Next, 250 milliLiters (mL) of each mixture was transferred to a filter press to evaluate ability of each mixture to plug and seal. The Ofite HTHP Filter Press was pressurized to 600 pounds per square inch (psi) with a back pressure of 100 psi, thereby maintaining a pressure differential of 500 psi and heated to 200° F. The mixture was shut in for 24 hours. After 24 hours, fluid loss was measured for 30 minutes. Table 3 provides results of the fluid loss for comparative mixture 1, comparative mixture 2, and inventive mixture 3.

TABLE 3

Fluid loss values for comparative mixture 1, comparative mixture 2, and inventive mixture 3.

| Fluid | Fluid loss (mL) |
|---|---|
| Comparative mixture 1 | 245 |
| Comparative mixture 2 | 5 |
| Inventive mixture 3 | 0 |

Furthermore, addition of conventional filtration control additives and the conformance sealant's compatibility with them would mitigate any initial fluid loss before the sealant sets in to a gel.

It was observed that comparative mixture 1 had the worst fluid loss. Comparative mixture 2 showed a controlled fluid loss due the presence of conventional filtration control additives. Finally, inventive mixture 3, which contained conventional filtration control additives, the alkaline nanosilica dispersion, and the water-soluble hydrolyzable compound, completely prevented any fluid loss by plugging filter disk. To further confirm the sealant's plugging ability, the Ofite HTHP Filter Press was cooled and depressurized. Water was injected from the top under a pressure of 20 psi. No water breakthrough was observed under this pressure.

For the purposes of describing and defining the present invention, it is noted that reference in this application to a characteristic of the subject matter of the present disclosure being a "function of" a parameter, variable, or other characteristic is not intended to denote that the characteristic is exclusively a function of the listed parameter, variable, or characteristic. Rather, reference in this application to a characteristic that is a "function" of a listed parameter, variable, etcetera, is intended to be open ended such that the characteristic may be a function of a single parameter, variable, etc., or a plurality of parameters, variables, etcetera.

It is also noted that recitations in this application of "at least one" component, element, etcetera, should not be used to create an inference that the alternative use of the articles "a" or "an" should be limited to a single component, element, etcetera.

For the purposes of describing and defining the present invention it is noted that the terms "substantially" and "approximately" are utilized in this application to represent the inherent degree of uncertainty that may be attributed to any quantitative comparison, value, measurement, or other representation. The terms "substantially" and "approximately" are also utilized in this application to represent the degree by which a quantitative representation may vary from a stated reference without resulting in a change in the basic function of the subject matter at issue.

Having described the subject matter of the present disclosure in detail and by reference to specific embodiments, it is noted that the various details disclosed in this application should not be taken to imply that these details relate to elements that are essential components of the various embodiments described in this application, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified in this application as preferred or particularly advantageous, it is contemplated that the present disclosure is not necessarily limited to these aspects.

What is claimed is:

1. A method of sealing a subsurface formation comprising:
   introducing a mixture with a first pH into the subsurface formation in which the mixture comprises:
   an aqueous solution,
   a filtration control additive comprising at least one of starch and polyanionic cellulose,
   sodium hydroxide,
   an alkaline nanosilica dispersion, and
   a water-soluble hydrolyzable organic salt selected from diethylene glycol diformate, ethylene glycol diacetate, and diethylene glycol dilactate; and
   allowing the water-soluble hydrolyzable organic salt to hydrolyze in the subsurface formation to form an acid at 70° C. or greater, thereby acidizing the mixture to a reduced second pH and causing the alkaline nanosilica dispersion to gel into a solid and seal the subsurface formation.

2. The method of claim 1, in which the mixture further comprises a viscosifier comprising at least one of bentonite and xanthan gum.

3. The method of claim 1, in which the aqueous solution comprises at least one of fresh water, salt water, brine, municipal water, formation water, produced water, well water, filtered water, distilled water, sea water, or combinations of these.

4. The method of claim 1, in which the aqueous solution comprises total dissolved solids of from 150,000 to 300,000 mg/L.

5. The method of claim 1, in which causing the alkaline nanosilica dispersion to gel into a solid and seal the subsurface formation thereby reduces an amount of fluid breakthrough from the subsurface formation.

6. The method of claim 1, in which the subsurface formation has a temperature of from 70 to 250° C.

7. The method of claim 6, in which the temperature of the subsurface formation activates the water-soluble hydrolyzable organic salt.

8. The method of claim 1, in which the first pH is greater than 7.

9. The method of claim 1, in which the second pH is less than 7.

10. The method of claim 1, in which the water-soluble hydrolyzable organic salt is diethylene glycol diformate and the acid is formic acid.

11. The method of claim 1, in which a gelation time of the mixture in the subsurface formation ranges from 2 minutes to 5 hours.

12. The method of claim 1, in which the subsurface formation comprises carbonate or sandstone.

13. The method of claim 1, in which a viscosity of the mixture is 5 cP or less when introducing the mixture into the subsurface formation.

14. The method of claim 1, in which the alkaline nanosilica dispersion is from 30 to 60 wt. % silicon dioxide.

15. The method of claim 1, in which the weight ratio of the alkaline nanosilica dispersion to the water-soluble hydrolyzable organic salt is from 50:1 to 80:1.

16. The method of claim 1, in which the water-soluble hydrolyzable organic salt is selected from diethylene glycol diformate and diethylene glycol dilactate.

* * * * *